United States Patent [19]
Olson

[11] Patent Number: 5,464,227
[45] Date of Patent: Nov. 7, 1995

[54] SEAL ASSEMBLY FOR A ROTARY MACHINE

[75] Inventor: Eric G. Olson, Hartford, Conn.

[73] Assignee: United Technologies Corporation, Hartford, Conn.

[21] Appl. No.: 263,155

[22] Filed: Jun. 20, 1994

Related U.S. Application Data

[63] Continuation of Ser. No. 928,836, Aug. 11, 1992, abandoned.

[51] Int. Cl.⁶ .................................................. F16J 15/16
[52] U.S. Cl. ...................... 277/96.1; 277/81 R; 277/134
[58] Field of Search ................................ 277/134, 81 R, 277/91, 96, 96.1, 82, 18, 67, 68

[56] References Cited

U.S. PATENT DOCUMENTS

| | | | |
|---|---|---|---|
| 3,241,842 | 3/1966 | Schweiger et al. | 277/68 |
| 3,572,727 | 3/1971 | Greiner | 277/91 |
| 3,977,685 | 8/1976 | Greenawalt et al. | 277/74 |
| 4,406,459 | 9/1983 | Davis et al. | 277/25 |
| 4,406,460 | 9/1983 | Slayton | 277/25 |
| 4,531,746 | 7/1985 | Amdall et al. | 277/53 |
| 4,795,167 | 1/1989 | Otsuka | 277/68 |
| 5,125,672 | 6/1992 | Wycliffe | 277/53 |
| 5,133,562 | 7/1992 | Lipschitz | 277/81 R |
| 5,174,584 | 12/1992 | Lahrman | 277/81 R |

FOREIGN PATENT DOCUMENTS 0224573  9/1989  Japan ......................... 277/81 R Primary Examiner—Daniel G. DePumpo
Attorney, Agent, or Firm—Gene D. Fleischhauer

[57] ABSTRACT

A seal assembly 46 for a rotary machine 10 is disclosed. Various construction details are developed which block the migration of oil from a compartment such as a bearing compartment 22. In one detailed embodiment, an annular clearance gap G is provided with an outwardly tapered surface (98; 118; 98, 118) to energize a boundary layer or to block lubricating fluid from migrating from the bearing compartment.

16 Claims, 2 Drawing Sheets

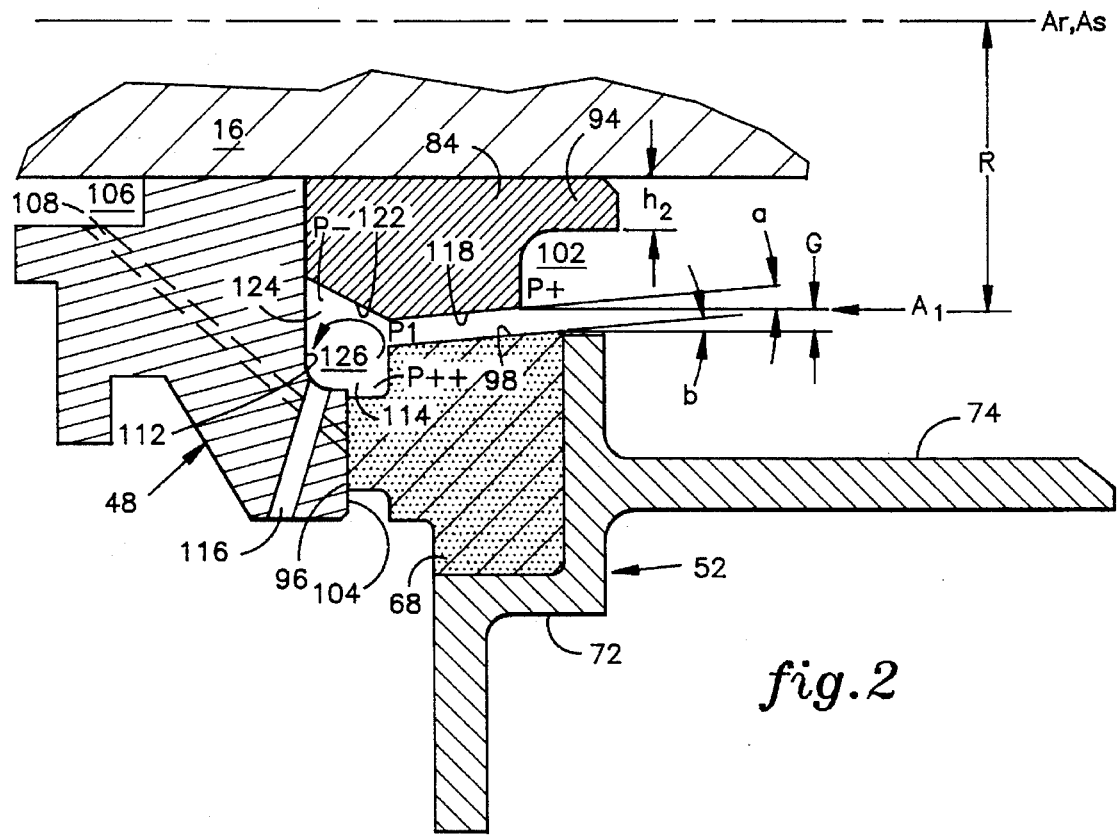
fig.2
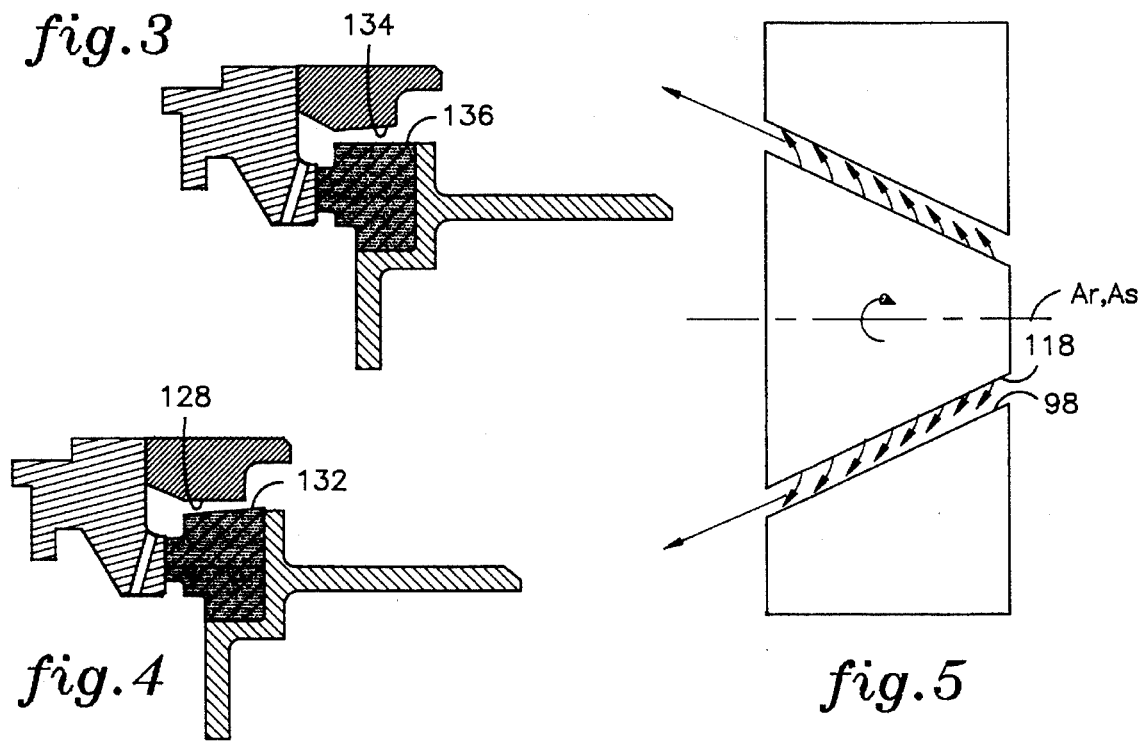
fig.3
fig.4
fig.5

5,464,227

SEAL ASSEMBLY FOR A ROTARY MACHINE

This is a continuation of Ser. No. 07/928,836, filed Aug. 11, 1992, now abandoned.

TECHNICAL FIELD

This invention relates to a seal assembly for a rotary machine and more particularly to a seal assembly adjacent to a bearing compartment of such a machine which blocks the entry of hot working medium gases into the bearing compartment and loss of lubricating fluid from the bearing compartment.

BACKGROUND OF THE INVENTION

An axial flow rotary machine, such as a gas turbine engine for an aircraft, includes a compression section, a combustion section and a turbine section. A flow path for hot working medium gases extends axially through the sections of the engine. The flow path for hot gases is generally annular in shape.

As the working medium gases are flowed along the flow path, the gases are compressed in the compression section causing the temperature and pressure of the gases to rise. The hot, pressurized gases are burned with fuel in the combustion section to add energy to the gases. These gases are expanded through the turbine section to produce useful work and thrust.

The engine has a rotor assembly in the turbine section which is adapted by a rotor disk and blades which extend outwardly therefrom to receive energy from the hot working medium gases. The rotor assembly extends to the compression section. The rotor assembly has compressor blades extending outwardly across the working medium flow path. The high energy working medium gases in the turbine section drive the rotor assembly about its axis of rotation. The compressor blades rotate with the rotor assembly and drive the incoming working medium gases rearwardly, compressing and heating the gases prior to the gases entering the combustion chamber.

The stator assembly includes a plurality of bearing compartments. Each bearing compartment has at least one bearing for supporting the rotating shaft of the rotor assembly from the stator assembly. The bearing in the bearing compartment is supplied with a lubricating fluid, such as oil, for lubricating its surfaces. A seal assembly extends between the rotating shaft and the bearing compartment to block the leakage of oil from the bearing compartment and the leakage of hot working medium gases into the bearing compartment.

One example of a seal assembly for such a bearing compartment is shown in U.S. Pat. No. 4,406,459 issued to Davis and Sidat entitled "Oil Weepage Return for Carbon Seal Plates" which is assigned to the assignee of this application. In this construction, the seal assembly has a seal plate which is rotatably attached to the rotor shaft. A seal element, typically formed of carbon, is supported by the stator assembly and is urged against the seal plate to block the leakage of oil out of the compartment and the leakage of working medium gases into the compartment. Oil is supplied to the location of abutting contact between the seal plate the seal element to lubricate these rubbing surfaces.

Oil supplied to these surfaces may flow from the seal assembly out into the region between the seal assembly and the rotor shaft. An oil return passage 58 in the seal plate provides a conduit for returning the oil to the bearing compartment. Rotation of the seal plate about the axis of the engine exerts a radial force on oil in the return passage and forces the oil radially outwardly through the passages.

Occasionally, oil leaking from the bearing compartment will migrate through cavities between the rotor shaft and the seal element into the interior of the engine. The oil may reach a location where it accumulates in insulation or is trapped in other areas of the engine. This creates a potential for fires should the oil come in contact with hot working medium gases which contain oxygen and remain there at a high enough temperature for a sufficient length of time to cause ignition.

The above art notwithstanding, scientists and engineers working under the direction of applicant's assignee have sought to further block the migration of oil from the bearing compartment into the interior of the rotary machine.

SUMMARY OF INVENTION

This invention is predicated in part on the recognition that rotational movement of the shaft about its axis of rotation will energize boundary layers adjacent the surfaces on the shaft and on elements attached to the shaft. These energized boundary layers may be employed to force oil which has leaked from the bearing compartment back toward the bearing compartment and, in constructions that have oil return holes, back to the oil return holes.

According to the present invention, a seal assembly for an oil containing compartment in an axial flow rotary machine adjacent to an annular chamber includes an annular gap between adjacent surfaces of the rotor and the stator which is in close proximity to the annular chamber, which is bounded by a rotating surface, and which has at least one of the bounding surfaces being outwardly tapered toward the chamber to pressurize the chamber.

In accordance with one embodiment of the present invention, the stator has a second surface which bounds the annular clearance gap, which is spaced from the rotating surface by a predetermined distance which is less than one-sixteenth of the radial distance from the axis of rotation to the annular gap.

In accordance with one detailed embodiment of the invention, the seal assembly includes an oil return passage which extends from the annular chamber to the bearing compartment and the rotational energy imparted to oil and gases through the boundary layer in the annular gap G drives oil toward the oil return passage.

A primary feature of the present invention is a seal assembly having two seal faces in rubbing contact at an interface. Another feature is an annular clearance gap between a stationary surface and a rotating surface in close proximity to the interface. Still another feature is that at least one of the surfaces bounding the gap is outwardly tapered toward the passage. In alternate embodiments, the tapered surface may be on the rotating component bounding the gap, the stationary component bounding the gap, or on both components bounding the gap. In one detailed embodiment, the angle that the surface makes with the axis of rotation is greater than three degrees. In this detailed embodiment, an oil return passage extends radially through a rotating component to the bearing compartment. An annular groove for collecting oil faces radially inwardly. A second collection groove is radially inwardly of the first collection groove and faces radially outwardly. In still another embodiment of the invention, the rotating component has an outwardly tapered surface which extends axially over a portion of the compartment; and, an inwardly tapered surface. The inwardly tapered surface extends axially over another portion of the component to bound the outwardly facing groove.

A principal advantage of the present invention is the integrity of the engine which results from blocking the loss of oil from a compartment by pressurizing the sealing interface. Another advantage is the minimal effect on engine efficiency required to pressurize the sealing interface which results from using an already existing boundary layer to provide a pumping force to pressurize the area adjacent the oil compartment. In one detailed embodiment, an advantage is the effectiveness of an oil return system which results from using both boundary layer forces and the interaction of angled surfaces with the boundary layer to direct the oil to the oil return passages.

The foregoing features and advantages of the present invention will become more apparent in light of the following detailed description of the best mode of carrying out the invention and in the accompanying drawings.

BRIEF DESCRIPTION OF DRAWINGS

FIG. 2 is an enlarged cross-sectional view of a portion of the components shown in FIG. 1.

FIG. 3 is an alternate embodiment of the annular gap shown in FIG. 2.

FIG. 4 is an alternate embodiment of the annular gap shown in FIG. 2.

FIG. 5 is a diagrammatic illustration of the interaction of the surfaces shown in FIG. 2.

BEST MODE FOR CARRYING OUT THE INVENTION

Figure 1:
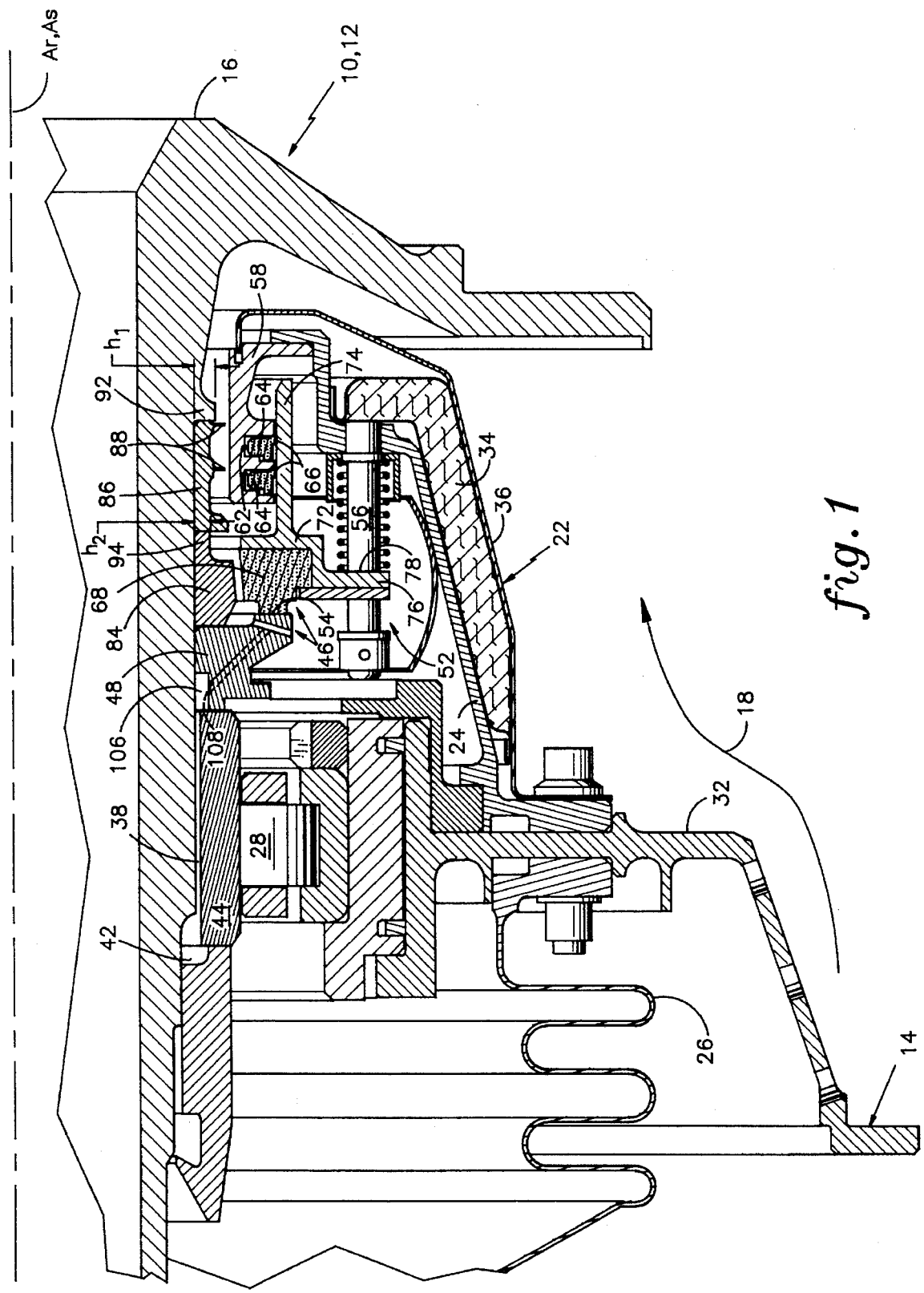
FIG. 1 is a simplified cross-sectional view of a bearing compartment for an axial flow rotary machine.

FIG. 1 is a side elevation view of part of an axial flow rotary machine 10. FIG. 1 shows a portion of the turbine section 12 of the machine to illustrate one embodiment of the present invention. The rotary machine has a stator assembly 14 which extends circumferentially about the engine. A rotor assembly, as represented by the rotor shaft 16, includes rotor blades (not shown). The rotor shaft has an axis of rotation $A_r$.

The rotor blades are adapted to extend radially outwardly across a flow path for hot, working medium gases (not shown) in the compression section (not shown) and the turbine section. Working medium gases are flowable from the working medium flow path in the compression section, as shown by the path 18, to provide cooling air to the turbine section. These gases are relatively hot compared to ambient temperature, but are relatively cool compared to the high temperatures of the turbine section.

The stator assembly 14 includes a bearing compartment 22 having walls 24, 26. A bearing 28 for rotatably supporting the shaft 16 is disposed in the bearing compartment. An annular support 32 for the bearing extends inwardly through the walls. At least a portion of the wall 24 has insulation 34 disposed about the bearing compartment. The insulation blocks the transfer of heat to the bearing compartment from the hot working medium gases 18. A shield 36 extends circumferentially about the insulation to shield the insulation from contaminants, such as migrating oil, on the interior of the engine.

An oil supply passage 38 extends inwardly of the bearing and is in flow communication with a source of pressurized oil (not shown) via an annular passage 42. The oil supply passage is in flow communication with passages through the inner race 44 (not shown) of the bearing assembly to lubricate the bearing 28 and other rotating components. As a result of the lubrication, the bearing compartment 22 contains oil and oil vapors.

A seal assembly 46 is provided to the shaft 16 and to the bearing compartment 22 to block the leakage of oil from the bearing compartment. The seal assembly includes a seal plate 48 rotatable with the shaft and a non-rotatable seal element assembly 52 which slidably engages the seal plate at a first location 54 and slidably engages the bearing compartment as discussed below.

The bearing compartment 22 has a plurality of axially extending rods 56 and a flange 56 having a pair of annular grooves 62 which face outwardly. Each outwardly facing groove carries a circumferentially extending piston ring 64 which extends circumferentially in the groove. Each piston ring has a sealing face 66 which adapts the piston ring to slidably engage the seal element assembly.

The seal element assembly 52 includes a carbon seal element 68 and a support ring 72 for the carbon seal element which extend about an axis $A_s$. The support ring has a circumferentially extending seal land 74 to slidably engage the sealing faces of the piston rings. The support ring has a circumferentially extending flange 76. The flange has a plurality of holes, as represented by the hole 78 to slidably engage the rods. A plurality of spring means, as represented by the spring 82, extends between the bearing compartment and the seal element assembly to urge the seal element assembly in the axial direction toward the seal plate 48.

In addition to the seal plate 48, the rotor assembly 16 includes a shaft element, as represented by the spacer 84. The spacer extends circumferentially about an axis $A_s$. The spacer abuts the seal plate and is rotatable with the shaft.

A circumferentially extending sleeve 86 having at least two radially extending knife edges 88 extend radially outwardly into proximity with the bearing compartment 22 to create a labyrinth seal. The rotor assembly 16 is adapted by a radially extending flange 92 to engage the sleeve. The radially extending flange has a radial height $h_1$. The shaft spacer element 84 has a radially extending flange 94 having a radial height $h_2$. The radial height $h_1$ and the radial height $h_1$ of the sleeve are greater than or equal to the radial height $h_2$ of the axially extending flange of the shaft element to ensure that axial loads are transmitted via the sleeve without introducing bending moments into the sleeve. At least a portion of the spacer extends radially outwardly past the flange.

FIG. 2 is an enlarged cross sectional view of the shaft spacer element 84, the seal element assembly 52 and the seal plate 48 shown in FIG. 1. Relative static pressures as shown by the symbols P−, P+, $P_1$, and P++.

As shown in FIG. 2, the carbon seal element 68 has a seal face 96 and an inwardly facing surface 98. The surface is spaced radially from the shaft 16 leaving a circumferentially extending cavity 102 therebetween. The surface extends axially in a first axial direction $A_1$ toward the seal plate. The surface diverges radially outwardly away from the axis of rotation $A_r$ and the axis $A_s$ in this first axial direction. The seal face 96 faces in the first axial direction. The seal face extends outwardly from the surface 98 and slidably engages the seal plate 48.

The rotatable seal plate 48 has a seal face 104 which faces in a second axial direction, opposite to the first axial direction. The seal face slidably engages the seal face 96 of the seal element 68 at a first location. The seal plate 48 has a circumferentially extending annular passage 106 for receiving lubricating oil from the passage 38. A plurality of oil passages for supplying oil to the seal face, as represented by the passage 108, extend radially outwardly from the annular passage to the seal face.

The seal plate 48 has a second face 112 which extends radially inward from the first location. The second face is spaced axially from the seal element 68 leaving a annular groove 114 therebetween. The annular groove faces radially inwardly. At least one oil return passage 116 extends radially outwardly from the annular groove through the seal plate and to the bearing compartment. The oil return passage places the bearing compartment in flow communication with the inwardly facing groove.

The spacer 84 has an outwardly facing first surface 118. The outwardly facing surface extends toward the first location in the first axial direction. The first surface diverges outwardly in that direction from the axis $A_s$ and from the axis of rotation $A_r$. The outwardly facing first surface is spaced radially from the inwardly facing surface of the seal element leaving a clearance gap G therebetween.

The spacer 84 has an outwardly facing second surface 122. The outwardly facing second surface extends convergently from the first surface in the first axial direction toward the shaft 16 and to the second radially extending surface 112 of the seal plate 48. In the embodiment shown, the first surface and the second surface extend radially to such an extent that the height $h_1$ of the flange is less than the radial height of the first surface 118 and the second surface 122. The outwardly facing second surface is spaced axially from the seal plate over at least a portion of the second surface leaving an outwardly facing groove 124 therebetween. The groove is bounded by the seal plate and the spacer element. The outwardly facing groove and the inwardly facing groove bound an annular chamber 126. The annular chamber is in flow communication with the annular clearance gap G between the seal element 68 and the spacer.

FIG. 3 is an alternate embodiment of the construction shown in FIG. 2 having a cylindrical surface 128 on the rotating shaft spacer element 84 and a frusto-conical surface 132 on the inwardly facing surface of the carbon seal element 68.

FIG. 4 is an alternate embodiment of the construction shown in FIG. 3 having a frusto-conical divergent first surface 134 on the shaft spacer element and a cylindrical inwardly facing surface 136 on the carbon seal element 68.

FIG. 5 is a schematic representation, enlarged and not to scale showing the relationship of the outwardly facing first surface 118 on the shaft spacer element to the inwardly facing surface 98 on the carbon seal element 68. The circumferentially extending boundary layer is shown by the arrows, with the direction of the arrows reflecting the mechanical interaction of the inclined surface 98 on the carbon seal element with the boundary layer.

During operation of the gas turbine engine embodiment of the rotary machine shown in FIG. 1, the rotor assembly 16 rotates about the axis of rotation $A_r$ at minimum speeds that exceed five thousand revolutions per minute. The bearing 28 engages the shaft and permits rotational movement of the shaft with respect to the stator assembly. Oil is flowed to the bearing compartment 22 to cool the rotating components and to lubricate critical components such as the bearings.

The seal plate 48 and carbon seal element 68 are two other components that require lubrication. Lubricating oil is flowed from the annular passage 106 radially outward via passage 108 through the rotating seal plate. As the oil is flowed outwardly, rotational forces exerted by the seal plate on the oil force the oil to the sealing interface at the first location between the seal plate and the carbon seal element. A portion of the oil supplied to the interface returns immediately to the bearing compartment 22 by flowing outwardly. Another portion of the oil flows radially inwardly into the outwardly facing annular groove 114. It is believed that the oil may enter with such velocity that it is propelled radially inwardly past the annular clearance gap G and against the second surface 122 of the spacer.

A portion of the oil may be urged toward the clearance gap G between the seal element 68 and the spacer 84. As the spacer is rotated circumferentially about the axis of the engine at high rotational speeds, the first surface 118 travels circumferentially about the axis of rotation $A_r$ at high velocities. The high velocity of the first surface creates an energized boundary layer which extends outwardly to the outwardly tapered stationary surface 98 on the seal element. The boundary layer and any oil trapped in the boundary layer are forced against this inclined surface. The inclined surface directs the oil toward the annular chamber 126 by mechanical interaction with the oil and by mechanically directing the energized boundary layer in that direction.

The clearance gap G is selected to be small enough to provide the pumping action to the oil which is required to return the oil to the annular chamber. There is another constraint on the size of the gap. The rotor assembly 16 moves radially outwardly and moves axially with respect to the stationary outer surface 98 in response to rotational forces and changes in operating temperatures. Accordingly, the clearance gap is selected to at least take into account these axial and radial movements. Angling each of the surfaces (surface 118—angle a; surface 98—angle b) with respect to the axis of rotation $A_r$ (and the axis $A_s$) with an angle which is at least three (3) degrees provides a definite beneficial result. In the embodiment shown, the angle is five (5°) for angle a and angle b. Increasing the angle will increase the beneficial result. However, angling the surfaces at a greater angle decreases the amount of axial movement that may be accommodated for a given radial gap and may require a greater radial clearance. Accordingly, there is a tradeoff in pumping efficiency between increasing the angle of the surfaces (which increases pumping efficiency) and the concomitant requirement to increase the radial gap (which reduces pumping efficiency) to accommodate relative axial movement.

Theoretically, the boundary layer is much larger than the annular gap and its approximate size may be calculated from equations for flat plate theory set forth in Viscous Fluid Flow (2nd Ed.) by F. M. White published by McGraw Hill, Inc. (New York 1991) at page 235 and introduction to Fluid Mechanics, (3rd Ed.) by Fox and McDonald published by John Wiley and Sons (New York 1985) at page 448. The optimum gap may be determined empirically. It is believed that acceptable performance will result when the a radial gap has a radial height which is less than or equal to one sixteenth of the radial distance from the axis of rotation to the radial gap, (that is, the radial height of the clearance gap G is normalized by the radius R to the gap).

There is a second benefit which results from angling the first surface. The innermost portion of the first surface 118 travels at a much lower circumferential velocity than the outermost portion of the first surface. If total pressure remains constant in the annular gap G, the difference in velocity creates a static pressure gradient $(P+>P_1)$ which urges any oil which might enter the gap toward the annular chamber 126 bounded by the outwardly facing groove 124 and the inwardly facing groove 114. If the total pressure increases markedly, the velocity differential between the two ends of the gap G decreases the effect that an adverse static pressure gradient ($P_1 > P+$) might have on oil leakage.

As the working medium gases are pumped into the annular chamber 126 adjacent the sealing interface, the gases expand, decreasing velocity and causing the static pressure P++ to rise adjacent the sealing interface. This acts to further block the loss of oil from the bearing compartment.

It is believed the groove 124 adjacent the face 112 of the seal plate and the convergent second surface 124 of the spacer 84 has a higher circumferential velocity at the radially inward portion P− than adjacent the stationary carbon seal element (P++), causing a static pressure gradient which urges the oil towards the face 112 of the rotating seal plate. In addition, the oil is mechanically directed towards this face by the angled second surface 122 which faces the surface 112 of the seal plate. The oil captured in this outwardly facing groove 124 is urged radially outwardly by rotational forces along the surface of the seal plate into proximity with the oil return passage 116. As the seal plate rotates about the axis of the engine, rotational forces acting on the oil urge the oil through the oil return passage into the bearing compartment.

The construction shown in FIG. 3 has the first beneficial effect of the construction FIG. 2, that is, mechanically urging the oil and the energized boundary layer toward the annular chamber 126.

The construction shown in FIG. 4 has the second beneficial effect of the construction shown in FIG. 2, that is, creating a static pressure gradient which acts to block the loss of oil.

As will be realized, preventing the oil from moving through the radial gap into other regions of the engine has beneficial results. For example, should the oil enter the insulation 34 surrounding the bearing compartment, it could provide both a source of combustible material and degrade the insulating performance of the insulation resulting in higher bearing temperatures and possible combustion in the bearing area.

The end of the spacer 84 h s a radial height $h_2$ which is equal to the height $h_1$ of the radial projection on the shaft which receives the axial load transmitted from the spacer element via the labyrinth seal element to the radial projection. This avoids any bending moments from being imposed on the sleeve element which would occur if the spacer element extended radially beyond the radial projection in the shaft.

Although the invention has been shown and described with respect to detailed embodiments thereof, it should be understood by those skilled in the art that various changes in form and detail thereof may be made without departing from the spirit and scope of the claimed invention.

I claim:

1. A seal assembly for a rotary machine which includes a rotor assembly having a rotatable rotor shaft, an outward reference direction which extends away from the shaft and an inward reference direction which extends toward the shaft, a stator assembly for supporting the shaft from the stator assembly, the seal assembly being disposed to block the leakage of lubricating fluid from the bearing compartment and the entry of hot working medium gases into the compartment, which includes:

a seal element which is not rotatable, the seal element being adapted to abut a seal plate at a first circumferentially extending region and having a radially inwardly facing surface which is spaced radially from the rotor shaft leaving a circumferentially extending cavity therebetween;

a rotor assembly having
a seal plate rotatable with the rotor shaft which extends circumferentially about the rotor shaft and outward from the rotor shaft to slidably engage the seal element at a first location, and which bounds the cavity between the seal element and the rotor shaft, and a shaft element which is rotatable with the shaft and extends radially outwardly from the rotor shaft across the cavity into proximity with the radially inwardly facing surface of the seal element leaving an annular chamber adjacent the first location, the shaft element having a radially outwardly facing surface which is spaced radially from the radially inwardly facing surface of the seal element leaving a clearance gap G therebetween which is in fluid communication with the annular chamber, the radially outwardly facing surface extending toward the first location;

wherein the radially inwardly facing surface of the seal element has a portion of the surface which bounds the annular gap G but does not bound the annular chamber and wherein rotation of the shaft element about the axis of rotation creates an energized boundary layer in the working medium gases in the annular gap G and wherein at least one of said surfaces radially adjacent the annular gap G diverges outwardly from the axis of rotation in the direction of the first location to direct lubricating fluid into the gap G and pressurize the annular chamber adjacent the first location to block fluid leakage from the bearing compartment.

2. The seal assembly of claim 1 wherein the radially outwardly facing surface on the shaft element diverges outwardly from the axis of rotation as the radially outwardly facing surface extends toward the first location.

3. The seal assembly of claim 2 wherein the radially inwardly facing surface on the seal element diverges outwardly from the axis of rotation as the radially inwardly facing surface extends toward the first location.

4. The seal assembly of claim 1 wherein the radially inwardly facing surface on the seal element diverges outwardly from the axis of rotation as the radially outwardly facing surface extends toward the first location.

5. The seal assembly of claim 1 wherein the outwardly facing surface of the shaft element is cylindrical in shape.

6. The seal assembly of claim 1 wherein the radially outwardly facing surface of the shaft element is a frusto-conical surface.

7. The seal assembly of claim 5 wherein the inwardly facing surface of the seal element is a frusto-conical surface.

8. The seal assembly of claim 6 wherein the radially inwardly facing surface of the seal element is frusto-conical in shape and is parallel to the radially outwardly facing surface of the seal element.

9. The seal assembly of claim 8 wherein a plane containing the axis of rotation and intersecting the radially inwardly facing surface of the seal element intersects the radially inwardly facing surface at a line having an angle to the axis of rotation which is greater than three (3°) degrees.

10. The seal assembly of claim 5 wherein a plane containing the axis of rotation and intersecting the inwardly facing surface of the seal element intersects the inwardly facing surface at a line having an angle to the axis of rotation which is greater than three (3°) degrees.

11. The seal assembly of claim 1 wherein the seal plate has at least one return passage for lubricating fluid extending through the seal plate and outwardly to the bearing compartment and wherein the annular chamber is in flow communication with the annular clearance gap G and the return passage.

12. For a rotary machine having a stator assembly, a rotor assembly which includes a shaft disposed inwardly of the stator assembly having an axis of rotation, an outward reference direction which extends away from the shaft and an inward reference direction which extends toward the shaft, a bearing compartment which includes a bearing disposed between the shaft and the stator assembly, a seal assembly for the bearing compartment which extends between the rotatable shaft and the stator assembly, which comprises:

a seal element which is a portion of the stator assembly and which is not rotatable with the shaft, the seal element having
  a seal face which faces in a first axial direction and which abuts the seal face of the seal plate, and
  an inwardly facing surface which diverges outwardly in the first axial direction toward the oil return passage;

a seal plate rotatable with the shaft which extends circumferentially about the shaft, the seal plate having
  a seal face which faces in a second axial direction and which abuts the seal face on the seal element,
  at least one oil supply passage for supplying oil to the face, and
  at least one oil return passage extending through the seal plate and outwardly to the bearing compartment;

a shaft spacer element which abuts the seal plate and which is rotatable with the shaft, the shaft spacer element having
  an outwardly facing first surface which is spaced radially inwardly from and parallel to the inwardly facing surface of the seal element leaving a clearance gap G therebetween such that the first surface diverges outwardly in the first axial direction toward the oil return passage, and
  an outwardly facing second surface which extends convergently inwardly from the first surface in the first axial direction toward the shaft and to the seal plate leaving an outwardly facing groove that is bounded by the seal plate and the spacer element;

wherein the seal plate and the seal element bound an inwardly facing groove which is in flow communication with the oil return passage, the outwardly facing groove traps oil which has leaded past the seal plate and the seal element for supply to the inwardly facing groove, and wherein the circumferential velocity of the first surface of the shaft spacer element about the axis of rotation creates a pressure force in the boundary layer between the spacer element and the seal element and wherein the clearance gap G is of radial dimension which enables the forces of the boundary layer to urge oil in the gap toward the first and second grooves for return to the bearing compartment.

13. The seal assembly of claim 12 wherein the angle of the first surface of the seal element and the first surface of the spacer element to the axis of rotation are each greater than or equal to three (3°) degrees.

14. The seal assembly of claim 13 wherein the surface of the seal element and the surface of the spacer element are parallel.

15. The seal assembly of claim 14 wherein the radial height of the annular clearance gap G is less than or equal to one-sixteenth of the radius from the axis of rotation to the annular clearance gap G.

16. The non-rotatable carbon seal element assembly of claim 1 wherein the angle of the radially inwardly facing surface to the axis $A_s$ is greater than or equal to three (3) degrees.

* * * * *